(12) United States Patent
Bollas et al.

(10) Patent No.: US 6,270,014 B1
(45) Date of Patent: Aug. 7, 2001

(54) TEMPERED WATER BLENDING SYSTEM

(75) Inventors: Christopher J. Bollas, Houston; Dai Duc Nguyen, Seabrook; Charles R. McAdams, Magnolia, all of TX (US)

(73) Assignee: Encon Safety Products, Houston, TX (US)

( * ) Notice: Subject to any disclaimer, the term of this patent is extended or adjusted under 35 U.S.C. 154(b) by 0 days.

(21) Appl. No.: 09/566,334

(22) Filed: May 8, 2000

Related U.S. Application Data

(63) Continuation of application No. 09/386,502, filed on Aug. 30, 1999, now abandoned.

(51) Int. Cl.[7] .......................... G05D 23/12; G05D 23/185
(52) U.S. Cl. ..................................... 236/12.12; 236/12.12; 4/676
(58) Field of Search .............................. 236/12.13, 12.12, 236/12.11, 93 B; 4/676; 700/239

(56) References Cited

U.S. PATENT DOCUMENTS

| | | |
|---|---|---|
| 4,739,793 | 4/1988 | Vollmer ................................ 137/599 |
| 4,767,052 | 8/1988 | Kostorz et al. ................... 236/12.22 |
| 5,058,804 | 10/1991 | Yonekubo et al. ............... 236/12.12 |
| 5,358,177 | 10/1994 | Cashmore ......................... 236/12.12 |
| 5,647,531 | 7/1997 | Kline et al. ....................... 236/12.14 |
| 5,979,776 | * 11/1999 | Williams ........................... 236/12.12 |

* cited by examiner

*Primary Examiner*—William Wayner
(74) *Attorney, Agent, or Firm*—Jenkens & Gilchrist, P.C.

(57) ABSTRACT

An emergency tempered water blending apparatus is described which has a threeway, thermostatic mixing valve for mixing a cold water intake stream with a hot water intake stream at effective proportions to form a tempered water output stream having a desired, preset temperature. When the flow of the cold water is detected, a normally-closed valve in the tempered water stream opens allowing flow to the user. Water flow defaults to cold water upon either a mechanical or electrical failure, or upon the temperature of the tempered water becoming too hot to reduce probability of failure in hot mode.

10 Claims, 1 Drawing Sheet

TEMPERED WATER BLENDING SYSTEM

This application is a continuation of application Ser. No. 09/386,502, filed Aug. 30, 1999, now abandoned.

FIELD OF THE INVENTION

The present invention relates to tempered water blending systems particularly useful on emergency safety showers.

BACKGROUND OF THE INVENTION

Tempered water safety showers are used in a wide range of industries in which workers are exposed to toxic and hazardous chemicals that can cause serious tissue damage upon contact. Occupational Safety and Health Administration regulations require the availability of emergency safety showers for use as a form of first aid treatment. ANSI standard Z358.1 requires that these showers can deliver at least 20 gallons of water per minute for a time period of 15 minutes over the body of a person who has been exposed to an aggressive chemical.

It has been found that there are problems relating to a 15-minute sustained time in cold water for any individual, and particularly for a person who is already in or subject to traumatic shock. The body quickly begins to react to the cold by shivering in order to fight off cold and generate body heat. The sustained flow of cold water increases the loss of body heat beyond the body's ability to maintain adequate temperature levels and further stimulates the metabolic rate to compensate. Ultimately, the user enters thermal shock and/ or refuses to remain in the shower for the time required for adequate treatment. Moreover, use of cold water discourages the effective, maximum use of the safety shower temperature for the 15-minute period which is required by the ANSI standard. Users tend to leave the shower much earlier when being deluged with cold water.

Tempered water blending systems usually provide drench water at almost 85° F–90° F., and at the temperature levels sufficient to provide relief to the affected tissue while allowing the user to remain immersed for the required treatment period. Most systems use basically mechanical, temperature-control devices which respond sluggishly to temperature changes with a pressure drop across the system of from about 30 to 40 psi. Even later-model electromechanical systems that allow existing plant hot and cold water supplies to be accurately and safely blended to a preset, non-adjustable, safe, utilization temperature leave something to be desired as far as responsiveness and fail-safe operation is concerned. Such systems are readily available in industrial safety catalogs. Because of this and other desires for tempered water safety showers, there exists a need for the development of a tempered water emergency shower that is simpler, more economical and safer to use.

SUMMARY OF THE INVENTION

It is an object of the present invention to provide a simple, economical and safe emergency shower apparatus for supplying tempered water having a desired, pre-selected temperature within a fraction of the time required using existing systems. The apparatus of the present invention provides a steady flow of tempered water having a preset temperature without significant temperature fluctuation. Temperature fluctuation is less than about ±3° F. The present invention accomplishes the desired outlet water temperature within a period of time less than about 1 second of the manual opening of a flow valve such as a safety shower head. The time it takes for the establishment of a steady flow of tempered water flow having the desired preset temperature from the sensing of flow after opening the flow control valve by the user is referred hereinafter as the response time. In contrast, current systems generally take much longer to establish a steady water flow having the desired preset temperature.

It is an object of the present invention to provide a tempered water shower apparatus having an infinitesimal probability to fail in hot mode, thereby providing a much safer device than prior art devices. For instance, the present invention apparatus is designed to fail (if such should occur) in the safe, not hot, mode.

These and other objects of the present invention will become apparent to an engineer with ordinary skill in the art of emergency tempered water safety systems from the following discussion. In accomplishing these objects, an apparatus is provided for supplying tempered water comprising a three-way, thermostatic, self-operated mixing valve for mixing the flow of a cold water stream with a hot water stream at effective proportions to form an output water stream having a temperature of a desired, preset temperature. The apparatus employs a sensor which detects the flow of the cold water stream to cause a normally closed solenoid valve in the tempered water line to open. The system includes a controller programmed to close the tempered water flow upon either a mechanical or electrical failure, or upon the temperature of the tempered water reaching a temperature greater than a predetermined value, while allowing flow to continue through the cold water bypass which is designed to flow about 30 gpm.

BRIEF DESCRIPTION OF THE FIGURES

The drawing shows a flow diagram showing a preferred embodiment of the present invention tempered water apparatus.

DESCRIPTION OF THE PREFERRED EMBODIMENT

Figure 1:
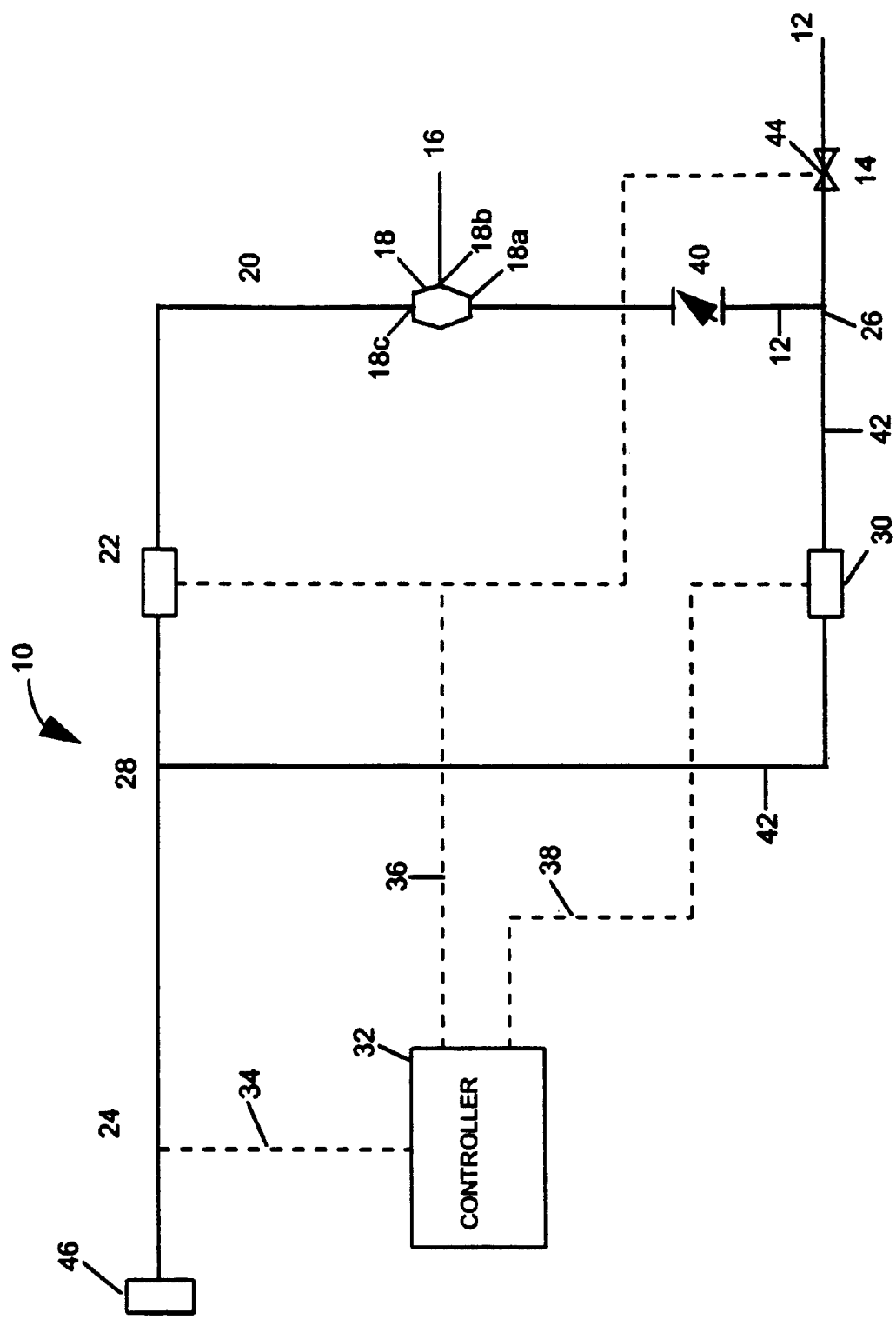

Referring to the drawing, there is shown the preferred embodiment of the tempered water system 10 of the present invention, having a cold water supply line 12, a hot water supply line 16 and a three-way self-regulating thermostatic mixing valve 18. Thermostatic valves are generally well known, e.g., as shown in U.S. Pat. Nos. 4,739,793; 4,767,052; and 5,647,531 which are incorporated by reference herein for all purposes. The preferred valve is an AMOT® valve Model C manufactured by AMOT Controls (Richmond, Calif.). These valves are well known to those skilled in the art.

Generally, the mixing valve 18 of the type used in the present invention comprises a valve body having cold-water inlet 18a, hot-water inlet 18b, and a tempered water outlet 18c. The cold-water inlet 18a and hot-water inlet 18b are connectable to pressurized cold and hot-water intake lines 12 and 16, respectively. The intake lines 12 and 16 are connected to plant supply lines. The valve body 18 defines a chamber having cold- and hot-water compartments connected to the cold- and hot-water inlets 18a and 18b, respectively, and to a mixed, tempered water compartment connected to the outlet 18c. Cold- and hot-water seats within the mixing valve 18 are bounding the respective inlet compartments. The valve 18 further comprises a thermostatically controlled actuator disposed within the mixed, tempered water compartment. The actuator is operatively connected with a valve closing body via a valve stem.

The valve closing body is displaceable between one end position engaging the hot-water seat, blocking flow from the hot-water inlet and permitting flow from the cold-water inlet and on opposite end position engaging the cold-water seat, blocking flow from the cold-water inlet and permitting flow from the hot-water inlet. In intermediate positions flow from both cold- and hot-water inlets is permitted through the mixing valve 18 into the tempered water outlet 18c. In the present invention this proporting valve is preferably initially set to allow flow of about 87 percent cold and 13 percent hot water. The temperature of the entering water streams and the desired outflow stream will determine the ultimate operating properties which, of course, are subject to change under actual operation.

The thermostatic actuator, or proportioning valve, in mixing valve 18 is capable of changing position or shape dependent upon temperature and can act on the valve closing body to move it to keep the temperature of the water in the outlet chamber substantially constant to a preset temperature. It is understood, of course, that many different types of self-regulating, thermostatic, mixing valves could be used in the practice of the present invention which are well known to the skilled process control engineer. The preferred mixing valve will have a flow coefficient of from about 7 to about 12, preferably of from about 8 to about 11, and most preferably of from about 9 to about 10. The pressure drop across the three-way mixing valve at a flow of 30 gallons of water per minute is from about 4 to about 12 psig, preferably from about 7 to about 8 psig.

According to the preferred embodiment of the present invention, a check valve 40 is operatively positioned in the cold water intake line 12 between the three-way mixing valve 18 and a flow sensor 14. The check valve 40 is selected to prevent flow or migration of hot water into the cold water line 12 during long periods of non-use or stand-by duty. Preferably, a check valve having a flow coefficient of from about 20 to about 40 should be used. The pressure drop across the check valve at a flow of about 26 gallons of water per minute should be from about 0.2 to about 1.1 psig, preferably from about 0.4 to about 0.9 psig. Of course, it is understood that many different types of check valves could be used without departing from the scope of the present invention.

An outlet line 20 is connected to the outlet 18c of the three-way, mixing valve 18. Outlet line 20 has a first normally-closed solenoid valve 22, and a temperature sensor 24 disposed downstream of the first normally-closed solenoid valve 22. A controller 32 is operatively connected to the sensor 24, the first normally-closed solenoid valve 22 and flow switch 14 through lines 34 and 36, respectively.

A cold water bypass line 42 connects to the cold water inlet line 12 at a joint 26 downstream the flow switch 14 and to the outlet line 20 at a point 28 downstream the first normally-closed solenoid valve 22, bypassing the mixing valve 18, and upstream of the temperature sensor 24. Bypass line 42 has a second normally-open solenoid valve 30 operatively positioned therein and operatively connected to the controller 32 through connector 38. It should be understood that any type of operative connections can be used to establish communication between the controller 32 and the temperature sensor 24, first and second solenoid valves 22, 30 and flow sensor 14. For instance, infrared, radio or other communication means could be used in addition to electrical or optical hard connections. The bypass line 42 intersects the outlet line 20 at 28 downstream of the first normally-closed solenoid valve 22 and at a position where the temperature sensor 24 can determine the tempered water temperature.

Normally the intersection 28 will be upstream of temperature sensor 24, but for purposes of this system, placing the temperature sensor 24 at the intersection 28 will be considered to be upstream of the sensor 24.

In operation, when the user opens a valve of a safety shower head (not shown), flow begins in cold water line 12, and flow sensor 14 transmits a signal to controller 32 and to first normally-closed solenoid valve 22 which opens. At the same time second normally-open solenoid valve 30 in the cold water bypass 42 is caused to close by either the direct 26 signal from the flow sensor 14 or controller 32. Within seconds tempered water having a preset desired temperature, normally from about 85°–90° F., will flow through line 20, past thermostat 24, and out the shower head 46 to drench the body of the user. Depending upon the size of the maximum flow rate chosen, the flow rate is from about 3 to about 30 gallons per minute (3 to 60 gallons per minute on higher volume systems), preferably of from about 25 to about 35 gallons per minute, and most preferably, in the system of the present invention, at about 30 gallons per minute. Cold and hot water enter mixing valve 18 through lines 12 and 16, respectively, at volumetric rates dependent upon the preset desired temperature of the tempered water. Preferably the mixing valve is set to allow the initial outlet flow to have about 13 percent hot and 87 percent cold water. This, of course, will vary with the temperature of water sources available. Tempered water exits outlet 18c of the mixing valve 18 through outlet line 20, first normally-closed solenoid valve 22 and temperature sensor 24, and through a shower head or eyewash assembly. The system design, to on a safety shower, can be sized to provide up to 60 gallons of water per minute, preferably up to 30 gallons of water per minute at the desired preset temperature. Since it is normally connected to a plant water supply, it will operate almost indefinitely. The temperature may be preset to any temperature between from about 50° F. to about 95° F., preferably from about 80° F. to about 90° F.

The preferred embodiment as shown in the drawing requires a minimum of 40 psi inlet pressure, maximum 80 psi inlet pressure, and maximum 10 psi differential pressure between the hot- and cold-water inlet streams. It operates over wide water supply temperature ranges to achieve 85° F. outlet temperature with maximum cold inlet temperature ranging from about 30° F. to about 82° F. In the event of electrical or mechanical failure, the first normally-closed solenoid valve 22 will close and the second normally-open solenoid valve 30 will open to put the apparatus in cold water by-pass mode with the system supplying cold water only through outlet line 24. Even with no electrical power available, cold water will flow, hot water will not, and the system of this invention will, even though uncomfortable, accomplish the drench function under an electric power outage. Thus, in the event of breakdown or disaster, as long as there is water available to the system, the system will function to deliver water to the shower.

The components of the apparatus of this system are minimized and are selected to reduce the overall pressure drop experienced in prior art systems. Therefore, the selection of components are to be considered. First normally-closed solenoid valve 22 and second normally-open solenoid valve 30 have flow coefficients of from about 8 to about 16, preferably from about 9 to about 15. The pressure drop across the solenoid valves 22 and 30 should range from about 3 to about 9 psig, preferably from about 5 to about 7 psig, at a flow of about 30 gallons of water per minute. Of course, it is understood that any of many different types of solenoids which are well known to the skilled process engineer can also be used. The primary consideration is the selection and installation of the solenoid valves in that the one in the cold water bypass valve defaults to the open position and the hot defaults to the closed position.

Flow sensor 14 is a readily available device selected to have a flow coefficient of from about 8 to about 10. The pressure drop across flow switch valve 14 should be from about 5 to about 11 psig at about 26 gallons of water per minute. Of course, it should be understood that many different flow sensors could be used without departing from the scope of the present invention.

Controller 32 is connected to the flow sensor, solenoid valves and temperature sensor, and may be fabricated from a number of relays, solid state circuitry or a computer with software. Such a device is well within the skill of the ordinary control engineer. The controller was tested in a number of situations relating to the failure of the mixing valve and thermostats, temperature sensing devices, such that an attempt was made to cause the system of this invention to fail in an unsafe mode; i.e., where hot water would exit the system.

The blending system of the present invention is designed to have a minimum probability to fail in hot mode, thereby providing a much safer device than previously available. It is adaptable to any device providing a tempered water flow, particularly safety shower or eye wash fountains, and can be retrofitted into existing operational systems.

It should be understood that the above description of the preferred embodiment is given by way of illustration for complying with the statutory requirements of enablement and best mode of patent law. Nothing in the above description should be construed as limiting the scope of the invention as this scope is defined in the appended claims, and changes in the system may become readily apparent to those skilled in the art without departing from the invention described and claimed herein.

What is claimed is:

1. An apparatus for supplying tempered water comprising:
   a three-way, thermostatic mixing valve for mixing a cold water intake stream with a hot water intake stream in proportions to form a tempered water outlet stream having a desired, preset temperature;
   a sensor for detecting flow of cold water and in the cold water intake stream to the mixing valve;
   a first normally-closed solenoid valve in the tempered water stream which opens in response to flow of cold water;
   a temperature sensor, operably connected to a controller, positioned in said tempered water output stream, downstream of said first solenoid valve; and
   said controller operably connected to said flow sensor and temperature sensor to maintain a steady tempered water flow within an acceptable range.

2. The apparatus of claim 1, which also comprises:
   a cold water bypass stream which intersects the tempered water stream downstream of said first solenoid valve and upstream of, or at, the temperature sensor.

3. The apparatus of claim 2 which also comprises:
   a second normally-open solenoid valve in the cold water bypass stream which closes in response to flow of cold water.

4. The apparatus of claim 3 wherein the controller is operatively connected to said second solenoid valve to open the valve to allow cold water to flow in response to the temperature sensor sensing a temperature in excess of a preset temperature.

5. The apparatus of claim 1 further comprising a check valve operably positioned in the cold water supply line downstream of said flow valve for preventing migration of the hot water stream into the cold water supply stream.

6. The apparatus of claim 1 wherein the mixing valve is set to initially allow flow of about 87% cold water and about 13% hot water into the tempered water line.

7. An apparatus for supplying tempered water comprising:
   a cold water intake line having a flow sensor;
   a hot water intake line;
   a three-way, thermostatic mixing valve operatively connected to said cold and hot water intake lines for mixing water from said cold and hot water intake lines into a single tempered water output stream having a preset temperature;
   an output line for receiving the tempered water stream, said output line having a first normally-closed solenoid operatively positioned thereon;
   a temperature sensor operatively positioned in the tempered water output line downstream of said first solenoid valve;
   a cold water bypass line connected at one end to said cold water supply downstream of said flow sensor, and at its other end connected to said tempered water line downstream, said first solenoid valve and upstream said temperature sensor, said cold water bypass line having a second normally-open solenoid valve operatively connected therein;
   a controller operatively connected to said temperature sensor, solenoid valves and cold water flow sensor which causes said second solenoid valve to close, the first solenoid valve to open upon detecting flow by the cold water sensor, and for closing said first solenoid valve and opening said second solenoid valve upon the sensing of a temperature in excess of a preset temperature by the temperature sensor.

8. The apparatus of claim 7 wherein the second solenoid valve opens in event of mechanical failure within the apparatus.

9. The apparatus of claim 7 wherein the cold water bypass will allow flow of at least about 30 gallons per minute.

10. An apparatus for supplying tempered water comprising:
    a three-way, thermostatic mixing valve having a hot water inlet, a cold water inlet, a mixing chamber, and a tempered water outlet;
    a cold water intake line operatively connected to said cold water inlet wherein said cold water intake line has a flow sensor operatively connected thereon to detect cold water flow, and a check valve operatively connected thereon between said flow sensor and said cold water inlet of the mixing valve;
    a tempered water outlet line operatively connected to said tempered water outlet wherein said tempered outlet has a first normally-closed solenoid valve operatively positioned therein and a temperature sensor positioned downstream said first solenoid valve to open in response to the flow sensor sensing flow of cold water;
    a cold water bypass line connecting said cold water intake line and tempered water outlet lines, bypassing said three-way, mixing valve, and having a second normally-open solenoid valve operatively positioned therein; and
    a controller responsive to a mechanical or electrical failure or increase in the temperature of the outlet water reaching a predetermined value to allow the first solenoid valve to close to halt flow of hot water and allow the second solenoid valve to open to allow flow of cold water through the bypass.

* * * * *